United States Patent [19]

Gittos et al.

[11] 3,758,690

[45] Sept. 11, 1973

[54] PHARMACEUTICAL COMPOSITIONS CONTAINING N-CYCLOPROPYL-1-AMINO INDANES AND USE OF SUCH N-CYCLOPROPYL COMPOUNDS AS HYPOTENSIVES

[75] Inventors: Maurice Ward Gittos, Slough; John William James, Langley; Leslie Frederick Wiggins, Herkshire, all of England

[73] Assignee: Aspro-Nicholas Limited, London, England

[22] Filed: June 5, 1970

[21] Appl. No.: 57,391

Related U.S. Application Data

[60] Division of Ser. No. 835,841, April 15, 1969, Pat. No. 3,629,463, which is a division of Ser. No. 652,029, July 10, 1967, abandoned, which is a continuation-in-part of Ser. No. 623,470, March 15, 1967, abandoned, which is a continuation-in-part of Ser. No. 385,761, July 28, 1964, abandoned.

[30] Foreign Application Priority Data

Aug. 2, 1963 Great Britain .................. 30,832/63
July 16, 1966 Great Britain .................. 32,067/66

[52] U.S. Cl. ................................................ 424/330
[51] Int. Cl. ............................................. A61k 27/00
[58] Field of Search ........................... 424/330, 266

[56] References Cited
UNITED STATES PATENTS
3,534,055  10/1970  Gittos et al. ...................... 260/295

FOREIGN PATENTS OR APPLICATIONS
4,230M  7/1966  France

*Primary Examiner*—Albert T. Meyers
*Assistant Examiner*—Frederick E. Waddell
*Attorney*—Janes and Chapman

[57] ABSTRACT

N-cyclopropyl-1-aminoindanes have useful pharmacological properties in that, when administered to hypertensive animals, including humans, they lower the blood pressure of these animals. Pharmaceutical compositions containing these compounds may be administered orally, rectally or parenterally in dosage unit form, each dosage unit containing from 1 to 150 mg. of active ingredient. Up to two or three dosage units may be administered four times daily. Reduced dosages may be used for maintenance therapy.

8 Claims, No Drawings

PHARMACEUTICAL COMPOSITIONS CONTAINING N-CYCLOPROPYL-1-AMINO INDANES AND USE OF SUCH N-CYCLOPROPYL COMPOUNDS AS HYPOTENSIVES

This application is a division of application Ser. No. 835,841, filed April 15, 1969, now U.S. Pat. No. 3,629,463, patented Dec. 21, 1971, which is a division of application Ser. No. 652,029, filed July 10, 1967, now abandoned, which is a continuation-in-part of application Ser. No. 623,470, filed March 15, 1967, now abandoned, which is in turn a continuation-in-part of Ser. No. 385,761, filed July 28, 1964, and now abandoned.

This invention relates to benzocycloalkane compounds and in particular to methods of treatment involving the administration of said compounds.

It has been found in accordance with the present invention that certain N-substituted 1-aminobenzocycloalkane compounds are useful in the treatment of hypertension in animals, including humans, in that they cause a pronounced lowering of blood pressure.

These aminobenzocycloalkane compounds are represented by the general formula:

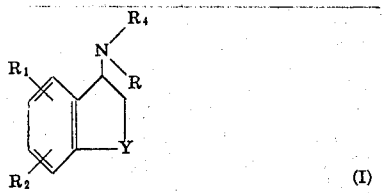

(I)

and the pharmaceutically acceptable salts thereof, wherein $R_1$ and $R_2$, which may be the same or different, are hydrogen, methyl, ethyl, halogen, for example, chlorine, bromine and fluorine, hydroxy or lower alkoxy; $R_3$ is hydrogen, lower alkyl or cyclopropyl; $R_4$ is cyclopropyl; and Y is methylene or ethylene.

The terms "lower alkyl" and "lower alkoxy" are used in this specification as meaning respectively alkyl and alkoxy groups containing from one to four carbon atoms, for example, methyl, ethyl, propyl, isopropyl, butyl, t.-butyl, methoxy, ethoxy, isopropoxy, butoxy, s.-butoxy and t.-butoxy.

Within the group of compounds encompassed by formula I, there is a pharmaceutically preferred group of compounds in which $R_3$ is hydrogen or cyclopropyl and/or $R_1$ and $R_2$ are other than hydrogen.

Specific compounds which may be used in accordance with the method of the present invention include
N-cyclopropyl-1-aminoindane
N-methyl-N-cyclopropyl-1-aminoindane
N-ethyl-N-cyclopropyl-1-aminoindane
N-isopropyl-N-cyclopropyl-1-aminoindane
N-t.butyl-N-cyclopropyl-1-aminoindane
N-cyclopropyl-5-methoxy-1-aminodane
N-cyclopropyl-6-methoxy-1-aminoindane
N-cyclopropyl-5,7-dimethoxy-1-aminoindane
N,N-dicyclopropyl-6-ethoxy-1-aminoindane
N,N-dicyclopropyl-4-butoxy-1-aminoindane
N-cyclopropyl-6-methyl-1-aminoindane
N-cyclopropyl-7-ethyl-1-aminoindane
N-ethyl-N-cyclopropyl-6,7-dimethyl-1-aminoindane
N-methyl-N-cyclopropyl-5-hydroxy-1-aminoindane
N-cyclopropyl-6-hydroxy-1-aminoindane
N-cyclopropyl-5-chloro-1-aminoindane
N-cyclopropyl-5,6-dibromo-1-aminoindane
N-cyclopropyl-7-fluoro-1-aminoindane
N-butyl-N-cyclopropyl-5-chloro-7-methoxy-1-aminoindane
N-cyclopropyl-4-methyl-6-bromo-1-aminoindane
N-cyclopropyl-1-amino-1,2,3,4-tetrahydronaphthalene
N,N-dicyclopropyl-1-amino-1,2,3,4-tetrahydronaphthalene
N,N-dicyclopropyl-5-ethoxy-1-amino-1,2,3,4-tetrahydronaphthalene
N,N-dicyclopropyl-7-ethyl-1-amino-1,2,3,4-tetrahydronaphthalene
N,N-dicyclopropyl-8-butoxy-1-amino-1,2,3,4-tetrahydronaphthalene
N-cyclopropyl-7-methoxy-1-amino-1,2,3,4-tetrahydronaphthalene
N-cyclopropyl-6,7-dimethoxy-1-amino-1,2,3,4-tetrahydronaphthalane
N-cyclopropyl-7-ethyl-1-amino-1,2,3,4-tetrahydronaphthalene
N-cyclopropyl-6,7-dichloro-1-amino-1,2,3,4-tetrahydronaphthalene
N-cyclopropyl-8-fluoro-1-amino-1,2,3,4-tetrahydronaphthalene
N-cyclopropyl-6-methoxy-7-bromo-1-amino-1,2,3,4-tetrahydronaphthalene
N-cyclopropyl-7-isobutoxy-1-amino-1,2,3,4-tetrahydronaphthalene
N-methyl-N-cyclopropyl-1-amino-1,2,3,4-tetrahydronaphthalene
N-s.butyl-N-cyclopropyl-1-amino-1,2,3,4-tetrahydronaphthalene
N-ethyl-N-cyclopropyl-5-chloro-1-amino-1,2,3,4-tetrahydronaphthalene
N-propyl-N-cyclopropyl-6-chloro-1-amino-1,2,3,4-tetrahydronaphthalene
N-methyl-N-cyclopropyl-6,8-dibromo-1-amino-1,2,3,4-tetrahydronaphthalene
N-ethyl-N-cyclopropyl-7-iodo-1-amino-1,2,3,4-tetrahydronaphthalene
N-butyl-N-cyclopropyl-5,8-di-t.-butoxy-1-amino-1,2,3,4-tetrahydronaphthalene
N-methyl-N-cyclopropyl-6-hydroxy-1-amino-1,2,3,4-tetrahydronaphthalene
N-cyclopropyl-7-hydroxy-1-amino-1,2,3,4-tetrahydronaphthalene
N-cyclopropyl-6,7-dihydroxy-1-amino-1,2,3,4-tetrahydronaphthalene The compounds for use in the present invention in which Y in formula I is ethylene are novel compounds and accordingly form a part of this invention. These novel compounds and the other compounds of formula I may be made using known procedures.

Thus, for example, the compounds of formula I may be prepared by reacting a compound of the formula:

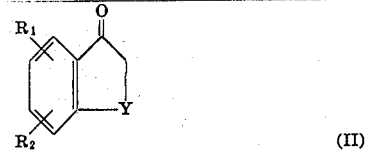

(II)

wherein $R_1$, $R_2$ and Y are as defined in formula I, with a N-substituted formamide of the formula:

HCONHR₅

(III)

wherein $R_5$ represents $R_3$ (other than hydrogen) or $R_4$, and submitting the resulting formamide to an acid or alkaline hydrolysis to form an N-monosubstituted 1-aminobenzocycloalkane of the formula:

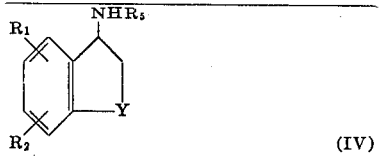

(IV)

wherein $R_1$, $R_2$, $R_5$ and Y are as defined above, (the compounds of formula IV wherein $R_5$ represents $R_4$ being, of course, compounds of this invention) and thereafter, if desired (when $R_5$ represents $R_4$) reacting the compound of formula IV with a lower alkylating or cyclopropylating agent, and necessarily (when $R_5$ represents $R_3$ which in turn is lower alkyl) reacting the compound of formula IV with a cyclopropylating agent, to produce the required compound of formula I in which $R_3$ is lower alkyl or cyclopropyl and $R_4$ is cyclopropyl, the benzocycloalkanes produced by the foregoing reactions being isolated either per se or as pharmaceutically acceptable salts thereof. Suitable lower alkylating and cyclopropylating agents for use in the above reaction include lower alkyl and cyclopropyl halides, for example chlorides, bromides and iodides, sulphates, benzenesulphonates and p-toluenesulphonates and the alkylating reaction is advantageously carried out in an inert solvent such as ether, benzene, toluene or dioxan, and in the presence of a proton acceptor, for example an excess of the benzocycloalkane of formula IV or an organic base such as an alkali metal, an alkali metal amide or an alkali metal hydride. Due to the poor reactivity of the above cyclopropylating agents, it is preferred that, when a compound of formula I in which $R_3$ is lower alkyl and $R_4$ is cyclopropyl is required, the N-cyclopropyl group be first attached to the ring and the resultant compound then lower alkylated.

The compounds of formula IV above may also be obtained by condensing a compound of the formula:

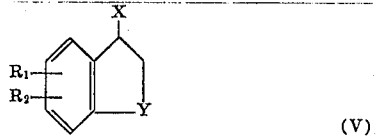

(V)

wherein $R_1$, $R_2$ and Y are as defined in formula I and X is halogen, preferably chlorine, with an amine of the formula:

$R_5$—NH₂

(VI)

wherein $R_5$ is as defined in formula III, advantageously using an excess of the amine or an organic base, for example pyridine, as a proton acceptor.

Alternatively the compounds of formula IV above may be prepared by reacting a compound of formula II, wherein $R_1$, $R_2$ and Y are as defined in formula I, with an amine of formula VI, wherein $R_5$ is as defined in formula III, in a suitable solvent such as benzene and either simultaneously or thereafter reducing the resultant 1-aminoindene or 1-amino-3,4-dihydronaphthalene to produce the required compound of formula IV, the reduction being effected with a reducing agent such as palladium on charcoal or palladium on barium sulphate.

The foregoing method is also the method of choice for preparing those compounds of formula I wherein $R_3$ and $R_4$ are both cyclopropyl. In that case the compound of formula II is reacted with dicyclopropylamine.

Salts of the compounds of formula I include acid addition salts and resin salts. Acid addition salts comprise pharmaceutically acceptable, non-toxic addition salts with suitable acids, such as those with inorganic acids, for example hydrochloric, hydrobromic, nitric, sulphuric or phosphoric acids, or with organic acids, such as organic carboxylic acids, for example acetic, glycollic, maleic, tartaric, citric, o-acetyloxy-benzoic, nicotinic or isonicotinic acid, or organic sulphonic acids, for example methane sulphonic, ethane sulphonic, 2-hydroxyethane sulphonic, p-toluene sulphonic or naphthalene 2-sulphonic acid.

A resulting acid addition salt may be converted into the free compound according to known methods, for example, by treating it with a base such as with a metal hydroxide, for example an alkali metal or alkaline earth metal hydroxide, for example lithium hydroxide, sodium hydroxide, potassium hydroxide or calcium hydroxide; a metal carbonate, such as an alkali metal or an alkaline earth metal carbonate or hydrogen carbonate, for example sodium, potassium or calcium carbonate or hydrogen carbonate; ammonia; with a hydroxyl ion exchange preparation, or with any other suitable reagent.

A resulting acid addition salt may also be converted into another acid addition salt according to known methods; for example, a salt with an inorganic acid may be treated with a metal salt, for example sodium barium or silver malt, of an acid in a suitable diluent, in which a resulting inorganic salt is insoluble and is thus removed from the reaction medium. An acid addition salt may also be converted into another acid addition salt by treatment with an anion exchange preparation.

A free compound may be converted into an acid addition salt according to known methods, for example, by reacting the base, preferably a solution thereof in a solvent or solvent mixture, with the appropriate acid or a solution thereof, or with an anion exchange preparation and isolating the desired salt, which may be obtained in the form of a hydrate or may contain solvent of crystallization.

Resin salts of the compounds of formula I, that is to say a substance in which the base is ionically bonded to an ion exchange material, may be obtained by contacting a cation exchange material with a solution in an inert, preferably polar, solvent of the base until the desired degree of saturation, usually substantially complete saturation, of the exchange material with the base has taken place. Suitable cationic exchange resins for this purpose are Zeocarb 225H, Dowex 50W-X8, Amberlite IR 120(H) and Amberlite IRC 50(H).

As previously mentioned, the compounds of formula I have been found to have a hypotensive activity and accordingly the present invention provides a method of lowering blood pressure in the animal, including human, body which method comprises administering in a sufficient non-toxic dose a compound of formula I of a pharmaceutically acceptable salt thereof.

It will be appreciated that for medicinal use, the compounds of the invention can be made up, in accordance with pharmaceutical techniques well known per se, into pharmaceutical compositions comprising as an essential active ingredient a derivative of formula I or a pharmaceutically acceptable acid addition salt thereof and a pharmaceutical carrier for the active ingredient. The pharmaceutical carrier may be an orally ingestible container for the active ingredient, for example a hard or soft gelatin capsule, or the carrier may be a pharmaceutical diluent or excipient which is in admixture with the active ingredient, for example starch, lactose, mannitol, sorbitol, calcium phosphate, talc, magnesium stearate, stearic acid, ethylcellulose, oil of theobroma, glycerin, or water, or a preservative such as for example m-ethyl p-hydroxybenzoate. The composition may be in a form suitable for oral, parenteral or rectal administration and may therefore take the form of, for example a sterile solution or suspension in water or other liquids for parenteral administration or a suppository for rectal administration. However, for clinical practice the compound of the invention will preferably be administered by the oral route and hence the preferred compositions will be made up in a form suitable for oral ingestion, for example solutions, suspensions, emulsions, elixirs, syrups, powders or tablets.

For clinical use, the compositions are advantageously made up in a dosage unit form adapted for the desired mode of administration. Thus for oral administration, the dosage unit may take the form of, for example, a tablet, pill, sachet, cachet, packaged powder or a hard or soft gelatin capsule which may enclose a liquid, semi-liquid or solid composition of the pure active ingredient. For administration by injection, the dosage unit may take the form of a container such as an ampoule containing either an injectable solution or a composition from which such a solution may be prepared. The quantity of active ingredient in each dosage unit will be such that one or more, and conveniently no more than two or three, units are required for each therapeutic administration. For example, the dosage unit for use in humans may contain from 1 to 150, advantageously 5 to 100 mg. of the active ingredient. The dosage units may be administered from two to four times daily depending on the condition of the patient. The number of dosages per day and/or the size of each dosage may be reduced during maintenance therepy, i.e. after the initial high blood pressure has been lowered to an acceptable level.

The following Examples illustrate the preparation of compounds and compositions in accordance with the invention.

EXAMPLE 1

Tablets each having the following composition were prepared as described below:

| | |
|---|---|
| N-cyclopropyl-1-aminoindane hydrochloride | 60 mg. |
| Lactose | 144 mg. |
| Maize starch (dried) | 35 mg. |
| Ethylcellulose N.100[1] | 4 mg. |
| Talc | 6 mg. |
| Magnesium stearate | 1 mg. |

[1] Ethylcellulose N.100 is a commercially available ethoxylated cellulose having an ethoxyl content of 47.5 to 49.0 percent. A 5 percent w/w solution in 80 parts toluene/20 parts ethanol has a viscosity of 80 to 105 at 25°C.

The N-cyclopropyl-1-aminoindane hydrochloride, lactose and a proportion of the starch (20 mg./tablet) were passed through a No. 44 (B.S.S.) mesh sieve and mixed together. The mixed powders were massed with a 5 percent w/w solution of othycellulose in isopropyl alochol and the mass granulated through a No. 12 (B.S.S) mesh sieve. The granules were dried at 40°C. and passed through a No. 16 (B.S.S.) mesh sieve. Finally the talc, magnesium stearate and the balance of the starch (all passed through a No. 60 (B.S.S.) mesh sieve) were added to the granules and the mixture compressed into tablets each weighing 250 mg. Two of such tablets when taken up to four times per day produced a marked lowering of the blood pressure of the patients to whom they were administered. After about 14 days treatment, a dose of only one tablet three times per day maintained the new lower level of blood pressure.

EXAMPLE 2

Tablets each having the following composition were prepared as desYNbed below:

| | |
|---|---|
| N-cyclopropyl-5-methoxy-1-aminoindane hydrochloride | 50 mg. |
| Lactose | 248 mg. |
| Maize starch (dried) | 70 mg. |
| Ethylocellulose N.100 | 8 mg. |
| Talc | 20 mg. |
| Magnesium stearate | 4 mg. |

The N-cyclopropyl-5-methoxy-1-aminoindane hydrochloride, lactose and a proportion of the starch (40 mg./tablet) were passed through a No. 44 (B.S.S.) mesh sieve and mixed together. The mixed powders were massed with a 5 percent w/w solution of ethylcellulose in isopropyl alcohol and the mass granulated through a No. 12 (B.S.S.) mesh sieve. The granules were dried at 40°C. and then passed through a No. 16 (B.S.S.) mesh sieve. Finally the talc, magnesium stearate and the balance of the starch (all passed through a No. 60 (B.S.S.) mesh sieve) were added to the granules and the mixture compressed into tablets each weighting 400 mg.

EXAMPLE 3

Capsules each having the following composition were made up as described below:

| | |
|---|---|
| N-cyclopropyl-1-aminoindane hydrochloride | 10 mg. |
| Lactose | 140 mg. |

The N-cyclopropyl-1-aminoindane and lactose were passed through a No. 44 (B.S.S) mesh sieve and well mixed together. The mixed powders were filled into hard gelatin capsules of, suitable size so that each contained 150 mg. of the mixture.

EXAMPLE 4

Capsules each having the following composition were made up as described below:

| | |
|---|---|
| N,N-Dicyclopropyl-1-aminoindane hydrochloride | 56 mg. |
| Lactose | 80 mg. |

This formulation was made up in the same way as described in Example 3 and filled into hard gelatin capsules so that each contained 130 mg. of the mixed powder.

EXAMPLE 5

Suppositories each having the following composition were made up as described below:

| | |
|---|---|
| N-Cyclopropyl-1-amino-1,2,3,4-tetrahydronaphthalene hydrochloride | 10 mg. |
| Oil of theobroma | 0.995 g. |

The N-cyclopropyl-1-amino-1,2,3,4-tetrahydronaphthalene hydrochloride was passed through a No. 60 (B-

.S.S.) mesh sieve and triturated with the molten oil of theobroma at 45°C. to form a smooth suspension. The mixture was stirred well and poured into moulds each of nominal 1 g. capacity to produce suppositories. Each suppository contained 10 mg. of N-cyclopropyl-1-amino-1,2,3,4-tetrahydronaphthalene hydrochloride.

EXAMPLE 6

Suppositories each having the following composition were made up as described below:

| | |
|---|---|
| N-Cyclopropyl-6,7-dimethoxy-1-amino-1,2,3,4-tetrahydronaphthalene hydrochloride | 50 mg. |
| Oil of theobroma | 0.975 g. |

The formulation was made up in the same way as described in Example 5 and each suppository contained 50 mg. of N-cyclopropyl-6,7-dimethoxy-1-amino-1,2,3,4-tetrahydronaphthalene hydrochloride.

EXAMPLE 7

A sterile powder for the preparation of an injection solution of N-cyclopropyl-N-methyl-1-aminoindane hydrochloride was prepared as described below:

A i. The N-cyclopropyl-N-methyl-1-aminoindane hydrochloride was sterilised by contact with ethylene oxide and 5 mg. quantities transferred aseptically to the sterile final containers which were then aseptically sealed. When required for use this sterile powder may be dissolved in 1 ml. or more of sterile normal saline solution for injection.

ii. The N-cyclopropyl-N-methyl-1-aminoindane hydrochloride was sterilised by contact with ethylene oxide and 100 mg. quantities transferred acceptically to the sterie final containers which were then aseptically sealed. When required for use this sterile powder may be dissolved in 1 ml. or more of sterile normal saline solution for injection.

B i. The N-cyclopropyl-N-methyl-1-aminoindane hydrochloride was dissolved in distilled water so that the resultant solution contained 10 mg./ml. Thin solution was then filtered through a bacteria proof filter and transferred aseptically into the final sterile containers which were then freeze dried under aseptic conditions. This sterile freeze dried powder may then be dissolved in 1 ml. or more saline solution for injection.

ii. The N-cyclopropyl-N-methyl-1-aminoindane hydrochloride was dissolved in distilled water so that the resultant solution contained 100 mg./ml. This solution was filtered through a bacteria proof filter and transferred aseptically into the final sterile containers which were then freeze dried under aseptic conditions. This sterile freeze dried powder may then be dissolved in 1 ml. or more of normal saline solution for injection.

EXAMPLE 8

Injection solutions of N-cyclopropyl-1-aminoindane hydrochloride were prepared an described below:

i. The N-cyclopropyl-1-aminoindane hydrochloride was dissolved in normal saline for injection so that the resultant solution contained 5 mg./ml. This solution was then filtered through a bacteria proof filter and transferred acceptically to the final sterile containers.

ii. The N-cyclopropyl-1-aminoindano hydrochloride was dissolved in normal saline for injection so that the resultant solution contained 10 mg./ml. This solution was filtered through a bacteria proof filter and transferred aseptically to the final sterile containers.

iii. The N-cyclopropyl--aminoindane hydrochloride was dissolved in normal saline solution for injection so that the resultant solution contained 50 mg./ml. This solution was then filtered through a bacteria proof filter and transferred aseptically to the final sterile containers.

EXAMPLE 9

A syrup was prepared as described below:

| | |
|---|---|
| N-Cyclopropyl-6-t.butoxy-1-amino-1,2,3,4-tetrahydronaphthalene hydrochloride | 1.0 g. |
| Glycerin | 50.0 ml. |
| Liquid invert sugar | 500.0 ml. |
| Methyl p-hydroxybenzoate | 1.0 g. |
| Propyl p-hydroxybenzoate | 0.4 g. |
| Propylene glycol | 10.0 ml. |
| Distilled water qs. to | 1.0 litre |

The N-cyclopropyl-6t. butoxy-1-amino-1,2,3,4-tetrahydronaphthalene was dissolved in 300 ml. of distilled water and the liquid invert sugar added to this solution.

Both the methyl and propyl p-hydroxybenzoates were dissolved in the propylene glycol with the aid of heat and the resultant solution diluted with the glycerin. This solution was then added to the prepared soluion of the tetrahydronaphthalene hydrochloride and further distilled water added to give a final volume of 1 litre.

Each 5 ml of prepared syrup contains 5 mg. of the active ingredient.

EXAMPLE 10

A syrup containing N-cyclopropyl-1-aminoindane hydrochloride was prepared as described below:

| | |
|---|---|
| N-cyclopropyl-1-aminoindane hydrochloride | 10.0 g. |
| Glycerin | 50.0 ml. |
| Liquid invert sugar | 500.0 ml. |
| Methyl p-hydroxybenzoate | 1.0 g. |
| Propyl p-hydroxybenzoate | 0.4 g. |
| Propylene glycol | 10.0 ml. |
| Distilled water qs. to | 1.0 litre |

This syrup was made up in the manner described in Example 9. Each 5 ml. of the prepared syrup contains 50 mg. of the active ingredient.

It will be appreciated that in Examples 1 to 10, the active compound specified may be replaced in whole or in part by other compounds of the invention having the necessary pharmacelogical activity and that other pharmaceutically acceptable salts may be employed in place of the hydrochloride salts.

EXAMPLE 11

A mixture of 1-chloroindane (13.42 g.1 .088 mole) and cyclopropylamino (1g.; 0.176 mole) was heated on a steam bath for 4 1/2 hours, during which time two layers formed, the lower one solidifying on cooling. Petroleum, other, b.p. 40°–60°C. (100 ml) was added, the solid cyclopropylamine hydrochloride filtered off, and the petroleum ether evaporated off from the filtrate. The resulting residue was dissolved in ether (30 ml.) and then extracted with dilute hydrochloric acid (5 N). At this stage a white crystalline precipitate was formed which was filtered off and recrystallised from isopropanol to obtain N-cyclopropyl-1-aminoindane hydrochloride, m.p. 189°–190°C. (4.8 .). The separated acid layer was made alkaline with 5N sodium hydroxide and the basic oil ether extracted. Addition of ethereal hydrogen chloride to the dried ether extract precipitated N-cyclopropyl-1-aminoindane hydrochloride as colourless crystals, m.p. 181°–182°C. after recrystallisation from isopropanol (2.8 g.) Total yield 7.6 g.

The above N-cyclopropyl-1-aminoindane hydrochloride (5 g.) was dissolved in water (50 ml.) and the solution treated with 5N sodium hydroxide (5 ml.). The resulting cloudy mixture was extracted with other, the extract dried and distilled to give N-cyclopropyl-1-aminoindane, b.p. 183°C./20 mm. or 65°–66°C. /0.05 mm. (3.6 g.)

EXAMPLE 12

A mixture of N-cyclopropyl-1-aminoindane (8.65 g.; 0.05 mole), ethyl iodide (4 g.; 0.025 mole) and methyl cyanide was refluxed for 12 hours. The methyl cyanide was evaporated off under reduced pressure and the residue warmed with anhydrous ether. The solid remaining undissolved was filtered off and the filtrate distilled to give N-ethyl-N-cyclopropyl1-aminoindane, b.p. 62-°-65°C. /0.1 mm.

EXAMPLE 13

A mixture of β-tetralone (14.6 g.; 0.1 mole), cyclopropylamino (5.7 g.; 0.1 mole), dry benzene (150 ml.) and cyclopropylamine a-toluene sulphonate (0.05 g) was refluxed for 48 hours in a Soxhlet apparatus using a thimble containg powdered calcium oxide. The benzene was distilled off and the residue distilled to give N-cyclopropyl-1-amino-3,4-dihydronaphthalene, b.p. 103°–5° C./0.6 mm.

A solution of N-cyclopropyl-1-amino-3,4-dihydronaphthalene (7 g.; 0.038 mole) in a mixture of glacial acetic acid (5 ml.) and absolute ethanol (50 ml.) was hydrogenated at room temperature and atmospheric pressure using palladium on charcoal (5 percent; 0.29 g.) as catalyst. After 0.038 mole of hydrogen had been absorbed, the solution was filtered, evaporated under reduced pressure, the residual oil diluted with water and the mixture made alkaline by the addition of dilute sodium hydroxide. N-Cyclopropyl-1-amino-1,2,3,4-tetrahydro-naphthalene separated as an oily layer and was extracted into ether. The ether extract was dried, concentrated and then treated wih ethereal hydrogen chloride. The precipitated hydrochloride was filtered off and crystallized from isopropanol to give N-cyclopropyl-1-amino-1,2,3,4-tetrahydronaphthalene hydrochloride m.p. 171°–172°C.

EXAMPLE 14

A mixture of 5-methoxy-1-indapono(6.1 g.; 0.038 mole), cyclopropylamine (2.17 g.; 0.038 mole), cyclopropylamine p-toluene sulphonate (0.05 g.), absolute ethanol (110 ml.), glacial acetic acid (2 ml.) and 5 percent palladium on barium sulphate (1 g.) was reacted at room temperature and atmospheric pressure. The warmed mixture was filtered, acidified with dilute hydrochloric acid, the ethanol evaporated off and the residue dissolved in water. The solution was extracted with ether, the aqueous layer separated and basified with dilute sodium hydroxide. The oily layer was isolated by ether extration. Distillation of the ether extract yeilded N-cyclopropyl-5-methoxy-1-aminoindane, b.p. 102°–106°C./0.3 mm. The base was converted to its hydrochloride by treatment with ethereal hydrogen chloride. After crystallisation from methanol it had a m.p. 172°–173°C.

EXAMPLE 15

A mixture of 5,6-dimethoxy-1-indanone(19 g.; 0.099 mole). cyclopropylamine (6.7 g.; 0.1 mole), cyclopropylamine p-toluenesulphonate (0.1 g.), absolute ethanol (150 ml.), glacial acetic acid (6 ml.) and 5 percent palladium barium sulphate (2 g.) was reacted at room temperature and atmospheric pressure. The mixture was then worked up as in Example 14 to give N-cyclopropyl-5,6-dimethoxy-1-aminoindane, b.p. 186°–190°C./15 mm. Treatment of the base with ethereal hydrogen chloride and crystallisation of the solid from ethanol gave N-cyclopropyl-5,6-dimethoxy-1-aminoindane hydrochloride, m.p. 193°C.

EXAMPLE 16

6-Methoxy-β-tetralone (19.1 g.; 0.11 mole) was treated with cyclopropylamine (8.7 g.; 0.13 mole) as in Example 13 to give N-cyclopropyl-6-methoxy-1-amino-3,4-dihydronaphthalene b.p. 130°–140°C./0. mm. (hydrochloride m.p. 191°–120°C.). This was then hydrogenated as in Example 13 to give the N-cyclopropyl-6-methoxy-1-amino-1,2,3,4-tetrahydronaphthalene, b.p. 118°C./1 mm.

We claim:

1. A method of lowering blood pressure in an animal body, which comprises administering orally, rectally, or pareterally to a hypertensive animal a therapeutically effective amount of a compound of the formula:

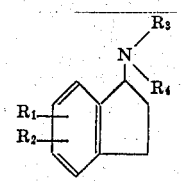

wherein $R_1$ and $R_2$ are selected from the group consisting of hydrogen, methyl, ethyl, halogen, hydroxy and lower alkoxy; $R_3$ is selected from the group consisting of hydrogen, lower alkyl and cyclopropyl; $R_4$ is cyclopropyl; or pharmaceutically acceptable salts hereof.

2. The method of claim 1, wheren $R_3$ is hydrogen or cyclopropyl.

3. The method of claim 1, wherein at least one of $R_1$ and $R_2$ is not hydrogen.

4. The method of claim 1, wherein said compound is selected from the group consisting of N-cyclopropyl-1-aminoindane; N-ethyl-N-cyclopropyl-1-aminoindane; N-cyclopropyl-5-methoxy-1-aminoindane; N-cyclopropyl-5,6-di-methoxy-1-aminoindane; and pharmaceutically acceptable salts thereof.

5. The method of claim 1, wherein said pharmaceutically acceptable salt is selected from the group consisting of acid addition salts and cation exchange resin salts.

6. The method of claim 5, wherein said acid addition salt is the hydrochloride.

7. The method of claim 1, wherein said compound is administered in dosage unit form, each dosage unit containing from 1 to 150 mg. of said compound.

8. A pharmaceutical composition in dosage unit form for lowering blood pressure in an animal body comprising from 1 to 150 mg. of a compound of the formula:

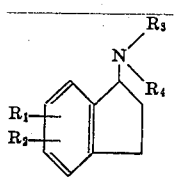
wherein $R_1$ and $R_2$ are selected from the group consisting of hydrogen, methyl, ethyl, halogen, hydroxy and lower alkoxy; $R_3$ is selected from the group consisting of hydrogen, lower alkyl and cyclopropyl; $R_4$ is cyclopropyl; or pharmaceutically acceptable salts thereof, and a pharmaceutically acceptable carrier.
* * * * *

UNITED STATES PATENT OFFICE
CERTIFICATE OF CORRECTION

Patent No. 3,758,690　　　　　　　Dated September 11, 1973

Inventor(s) Maurice Ward Gittos et al.

It is certified that error appears in the above-identified patent and that said Letters Patent are hereby corrected as shown below:

Column 1, lines 25 to 30:

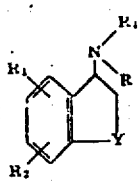

should be

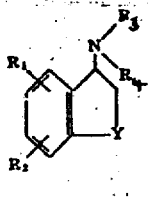

| | |
|---|---|
| Column 4, line 37: | "malt" should be --salt-- |
| Column 4, line 64: | "of", 2nd occ. should read -- or -- . |
| Column 5, line 32: | "of" should be --or-- |
| Column 5, line 63: | insert after "105" --cP.-- |
| Column 6, line 1: | "athycellulose" should be --ethylcellulose-- |
| Column 6, line 17: | "desYNbed" should be --described-- |
| Column 6, line 44: | insert after "aminoindane" --hydrochloride-- |

3,758,690 -2-

| | |
|---|---|
| Column 7, lines 33 & 34: | "acceptically" should be --aseptically-- |
| Column 7, line 39: | "Thin" should be --This-- |
| Column 7, line 45: | insert after "more" --of normal-- |
| Column 7, line 64: | "aceptically" should be --aseptically-- |
| Column 8, line 3: | "N-cyclopropyl--aminoindane" should be --N-cyclopropyl-1-aminoindane-- |
| Column 8, lines 28 & 29, | "soluion" should be --solution-- |
| Column 8, line 57: | "1.088" should be --.088-- |
| Column 8, line 58: | "cyclopropylamino" should be --cyclopropylamine-- |
| Column 8, line 58 | "(1g.;)  should be --(10g.;) |
| Column 9, line 1: | "(4.8.)" should be --(4.8g.)-- |
| Column 9, line 11: | "other" should be --ether-- |
| Column 9, line 27: | "propylamino" should be --propylamine-- |
| Column 9, line 29: | "a-toluene" should be --p-toluene-- |
| Column 9, line 31: | "containg" should be --containing-- |

3,758,690

| | |
|---|---|
| Column 9, line 55: | "1-indapono" should be --1-indanone-- |
| Column 9, line 66: | "extration" should be --extraction-- |
| Column 10, line 10: | insert after "palladium" --on-- |
| Column 10, line 23: | "140° C./0." should be --140° C./0.1-- |
| Column 10, line 46: Claim 1 | "hereof" should be --thereof-- |

Signed and sealed this 19th day of November 1974.

(SEAL)
Attest:

McCOY M. GIBSON JR.
Attesting Officer

C. MARSHALL DANN
Commissioner of Patents